United States Patent [19]

Lindberg et al.

[11] Patent Number: 5,190,419
[45] Date of Patent: Mar. 2, 1993

[54] BALL END MILL AND THROW AWAY INSERT FOR SUCH END MILL

[75] Inventors: Hans Lindberg; Lars-Gunnar Wallström, both of Sandviken, Sweden

[73] Assignee: Sandvik AB, Sandviken, Sweden

[21] Appl. No.: 717,644

[22] Filed: Jun. 19, 1991

[30] Foreign Application Priority Data

Jun. 19, 1990 [SE] Sweden .................................. 9002171

[51] Int. Cl.[5] .............................................. B23C 5/20
[52] U.S. Cl. ......................................... 407/42; 407/54; 407/113
[58] Field of Search .................. 407/34, 40, 42, 53, 407/54, 60–62, 113

[56] References Cited

U.S. PATENT DOCUMENTS

| | | | |
|---|---|---|---|
| 4,252,480 | 2/1981 | Mizuno et al. | 408/223 |
| 4,486,127 | 12/1984 | Eckle | 407/114 |
| 4,566,827 | 1/1986 | Neumueller | 407/54 X |
| 4,618,296 | 10/1986 | Allaire et al. | 407/42 |
| 4,699,549 | 10/1987 | Shimomura et al. | 407/42 |
| 4,838,739 | 6/1989 | Stashko | 407/42 |
| 4,898,500 | 2/1990 | Nakamura et al. | 407/42 X |
| 4,927,303 | 5/1990 | Tsujimura et al. | 407/42 X |

FOREIGN PATENT DOCUMENTS 0307949 3/1989 European Pat. Off. .
59-73216 4/1984 Japan .

Primary Examiner—Steven C. Bishop
Attorney, Agent, or Firm—Burns, Doane, Swecker & Mathis

[57] ABSTRACT

A ball nose end mill comprises a body having a semi-spherical front surface and a plurality of indexable cutting inserts. A central one of the inserts is of generally triangular shape, and the additional inserts are of generally rectangular shape. The central insert has a generally convexly curved top surface, and the cutting edges thereof include main cutting edges which are convexly curved when the central insert is viewed from the side.

15 Claims, 6 Drawing Sheets

C-C

B-B

D-D

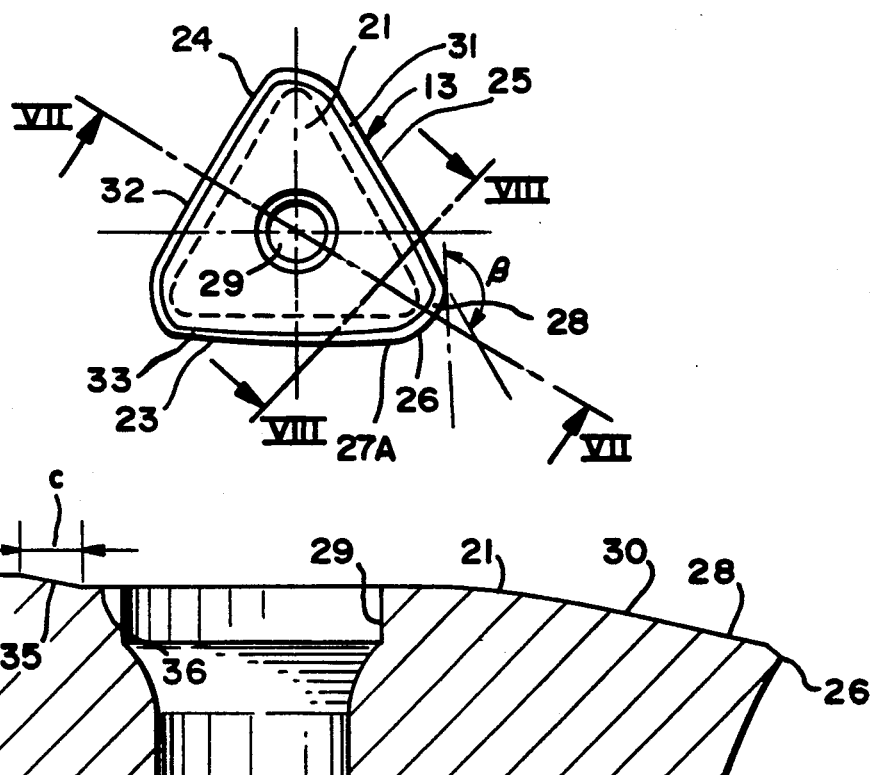
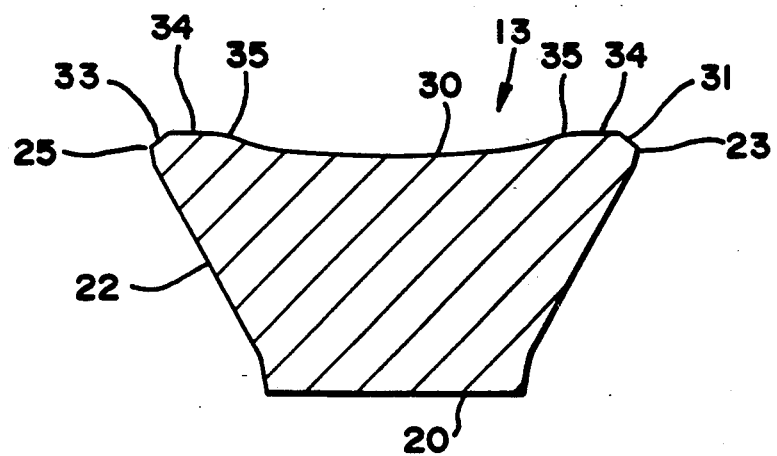

BALL END MILL AND THROW AWAY INSERT FOR SUCH END MILL

BACKGROUND OF THE INVENTION

The present invention relates to a ball end mill for the chipforming machining of metal workpieces. The end mill comprises a tool body that is rotatable about its longitudinal axis. The forward end of the tool body is hemispherically shaped and has several separate pockets for the receipt of indexable inserts. One of the inserts is substantially triangular in shape and is mounted tangentially in the mantle surface of the tool body close to its center such that the main cutting edge of the insert is oriented generally radially and has one of its corner portions located at the center of the tool body. The invention furthermore relates to a polygonal throw away insert specifically designed for use with such an end mill.

Such ball nose end mills with indexable inserts are previously known, for instance as disclosed in U.S. Pat. No. 4,252,480. That ball nose end mill includes a central insert having a cutting edge of convex shape along a portion of the periphery of one of its side surfaces for the purpose of reducing the thrust forces. A basically similar ball end mill with throw away inserts is known from U.S. Pat. No. 4,618,296 in which all inserts have a generally triangular shape and are tangentially oriented in the tool body. The convex formation is achieved by making the outermost surface of the insert partially convex in shape.

It has been discovered, however, that the cutting forces acting on each insert of the above-described known ball end mills become high and are unfavorably distributed over the tool body. Further, each insert must be active during a long cutting engagement in the workpiece. It would, therefore, be desirable to provide a ball end mill with several inserts that are mounted in an optimal fashion over the mantle surface of the end mill so that a more limited portion of the cutting insert corner comes into engagement with the workpiece at different engagements.

With this background in mind, it is an object of the present invention to provide a ball nose end mill in which a more optimal and even distribution of the cutting forces acting on the inserts is achieved while providing for good chip removal at each insert.

SUMMARY OF THE INVENTION

These and other objects have been achieved by a ball nose end mill comprising a rotary body which is rotatable about a longitudinal axis. A forward end surface of the body is of generally hemispherical shape and includes a plurality of cavities. Indexable cutting inserts are mounted in respective ones of the cavities. A central one of the inserts is of substantially triangular shape and is mounted closely adjacent the longitudinal axis. The front insert includes a forwardly facing, substantially triangular top face, and a plurality of edge faces intersecting one another to form three corner regions and intersecting the top face to form therewith a plurality of main cutting edges. Each of the main cutting edges is disposed between two of the corner regions and is convexly curved when viewed in a direction toward its respective edge face. The central insert is mounted such that one of the main cutting edges thereof constitutes an active cutting edge positioned in a cutting orientation. One of the corner regions of the central insert is situated at an end of the active cutting edge and is located immediately adjacent the axis. The cutting inserts include additional inserts of substantially rectangular shape. Each of the additional cutting inserts includes a circumferentially facing, generally rectangular top face and a plurality of edge faces interconnecting such top face to form therewith a plurality of cutting edges. Each of the additional inserts is arranged such that one cutting edge thereof constitutes an active cutting edge positioned in a cutting orientation. The plurality of additional inserts includes first and second additional inserts whose cutting edges are convexly curved when viewed in a direction toward their respective top faces. The first and second additional inserts have their active cutting edges disposed on opposite sides of the axis and lying generally in a first plane which contains the axis.

The present invention also relates to an indexable cutting insert which is adapted for use in a ball nose end mill. That insert comprises a substantially flat bottom face from which the insert is to be supported, and a generally convexly top face disposed opposite the bottom face. A plurality of edge faces interconnect the top and bottom faces and intersect the top face at an acute angle. The intersection of the end faces with the top face forms a plurality of main cutting edges and a plurality of secondary cutting edges. The secondary cutting edges are located at respective corner regions of the insert and are convexly curved when the top face is viewed in plan. Each of the main cutting edges is located between respective pairs of the corner regions and is generally convexly curved when viewed in a direction toward its respective edge face. Each of the main cutting edges is straight when the top face is viewed in plan. Each of the secondary cutting edges intersects first and second ones of the main cutting edges at first and second points of intersection, respectively. A first line tangent to the first point of intersection coincides with the first main cutting edge as the top face is viewed in plan. A second line tangent to the second point of intersection forms an angle with the second main cutting edge as the top face is viewed in plan.

BRIEF DESCRIPTION OF THE DRAWINGS

The objects and advantages of the invention will become apparent from the following detailed description of preferred embodiments thereof in connection with the accompanying drawings, in which like numerals designate like elements, and in which:

FIG. 6 is a plan view of the central insert;

FIG. 7 is a sectional view taken along the line VII—VII in FIG. 6;

FIG. 8 is a sectional view taken along the line VIII—VIII in FIG. 6;

DETAILED DESCRIPTION OF PREFERRED EMBODIMENTS OF THE INVENTION

Figure 1:
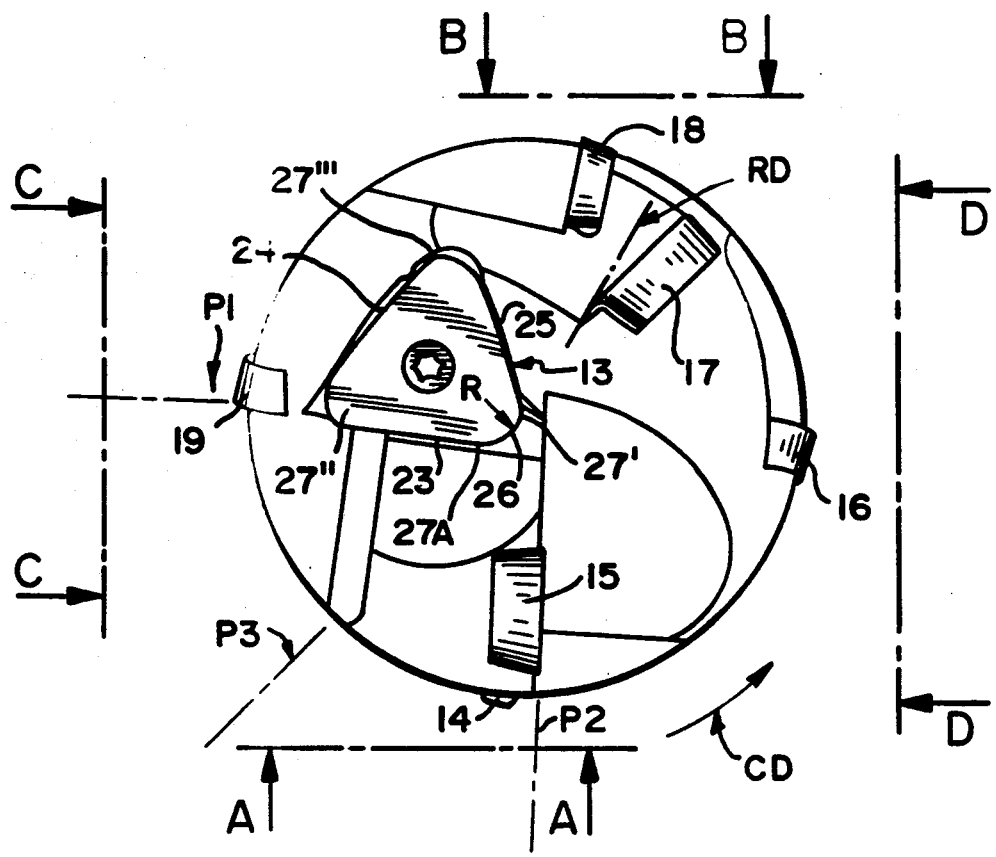
FIG. 1 is an end view of a ball end mill having a plurality of indexable inserts, according to the present invention.

With reference to FIGS. 1 and 2-5, a ball nose end mill has a cylindrical shank 10 rotatable in a direction of cutting CD around a central longitudinal axis 11. The shank terminates in a substantially hemispherical cutting face 12 in which there are provided cavities. The surface 12 is generated by a radius R' (see FIG. 2). The cavities are shaped to receive indexable cutting inserts 13-19 made preferably of cemented carbide. A central insert 13, i.e., the insert located close to the longitudinal axis 11, includes a bottom face 20 and a top face 21 (see FIG. 1A). The insert 13 is of substantially triangular shape when viewed in plan, i.e., in a direction toward its top face (see FIG. 1). The top face 21 is convexly shaped, more specifically is in the general shape of a portion of a sphere so as to generally conform to the profile of the hemispherical face 12 (see FIG. 3). All of the additional inserts 14-19 of this end mill are substantially rectangular in shape and have planar, parallel bottom and top faces.

The top faces of all of the inserts 13-19 are centrally apertured for the receipt of central clamp screws for securing the inserts to the end mill body. That aperture extends completely through the top and bottom faces of the respective insert. Each insert includes edge faces (e.g., see the edge faces 22 of the insert 13) which intersect the top face to form cutting edges therewith.

The central insert 13 has three identical cutting edges 23, 24, 25. Bevels 33, 32 and 31 are situated immediately inwardly of the cutting edges 23, 24, 25, respectively.

The cutting inserts 13-19 are of positive shape, i.e., each of the edge faces thereof intersects the top face at an acute angle. The degree of inclination of the edge faces relative to the top face varies around the insert. More specifically, the inclination of such edge face is greater at the corner regions of the insert than at the intermediate regions of the edge face. By "intermediate" region is meant a region of the edge face situated between the corner regions of the insert. When the inserts 13-19 are mounted in the end mill body, the cutting edges present an effective chip angle that is negative with respect to the radial direction RD (see FIG. 1) and positive with respect to the axial direction 11 (see FIG. 2), which contributes to a smooth and efficient working behavior of the tool.

Figure 1A:
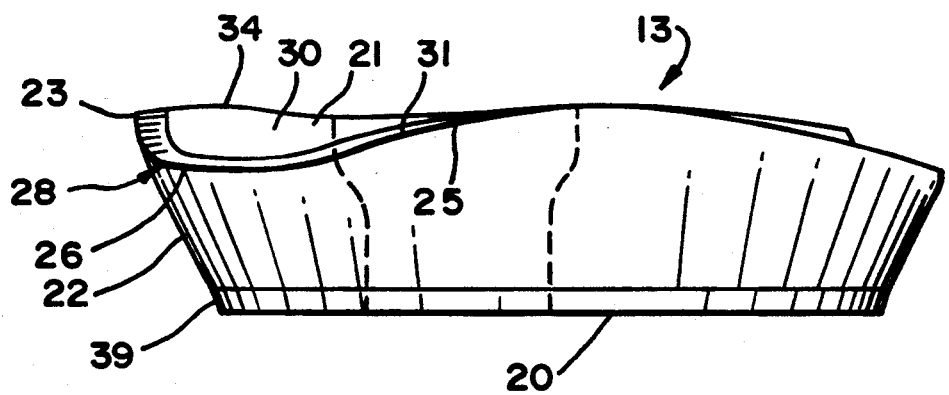
FIG. 1A is a side view of the center insert as seen in direction D—D in FIG. 1.

First and second ones of the additional inserts 16 and 19 have their active cutting edges located on opposite sides of the axis 11 and substantially in a common first radial plane P1 which contains the axis 11 (see FIG. 1). A third one of the additional inserts 15 has a convexly curved active cutting edge arranged substantially in a second plane P2 which is different from the first plane and which contains the axis 11. Fourth and fifth ones of the inserts 14, 18 have straight main cutting edges arranged substantially in a common plane, e.g., the second plane P2, which is oriented substantially perpendicular to the first plane P1 and which contains the axis 11. Thus, the inserts 14, 15 and 18 have their active cutting edges arranged substantially in the second plane P2. A sixth one of the additional inserts 17 has a convexly curved active cutting edge arranged substantially in a third plane P3 which contains the axis 11 and which is different from both of the first and second planes P1, P2. Alternatively, the sixth additional insert 17 could be positioned such that its cutting edge is arranged substantially within the second plane P2.

The inserts 15 and 17 are located axially rearwardly relative to the central insert 13 and axially forwardly relative to the inserts 16 and 19. The inserts 16 and 19 are located axially forwardly relative to the inserts 14 and 18. The inserts 14 and 18 have straight active cutting edges arranged substantially diametrically opposite one another and extending substantially parallel to the axis 11.

Figure 5:
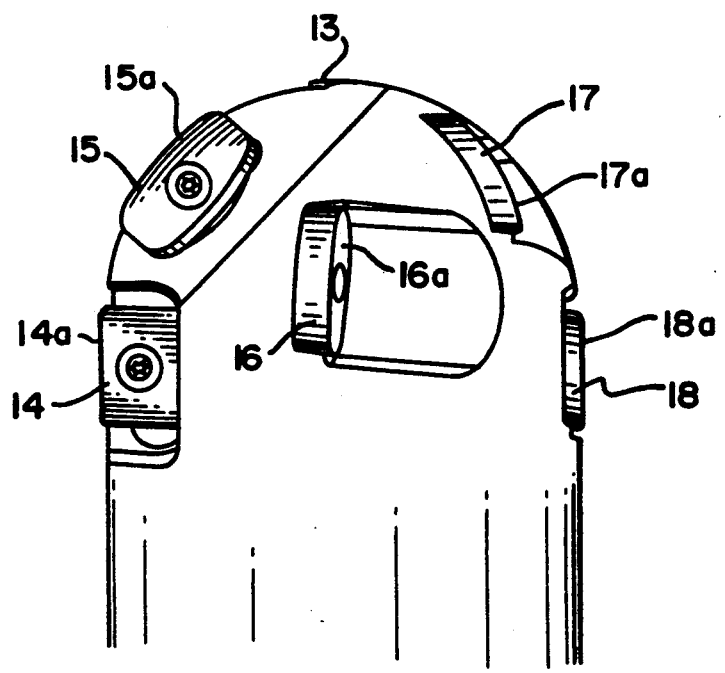
FIG. 5 is a side elevational view as seen in direction D—D in FIG. 1.

As shown in FIG. 5, the inserts 14 and 18, which are located axially rearwardly of all other inserts, are provided with straight elongated main cutting edges 14a and 18a. The more forwardly located inserts 15, 16, 17 are provided with cutting edges 15a, 16a, 17a which are convexly curved when viewed in a direction toward the respective top face (e.g., see FIG. 4). The inserts 19, which is visible in FIG. 1, has a design corresponding to that of the inserts 15, 16, 17. Inserts 14 and 18 could alternatively be square in shape. In another embodiment, insert 14 could have a design similar to insert 15.

The cutting edges of the insert 13 comprise a plurality of main cutting edges 23, 24, 25 each extending between the insert corners, and a plurality of secondary cutting edges 26 extending around the insert corners. Each of the secondary cutting edges 26 is generated by a radius R (see FIG. 1). Each main cutting edge is convexly curved when viewed in a direction toward the respective edge face (see FIG. 1A). When the insert 13 is viewed in plan (FIG. 1), it can be seen that each of the secondary cutting edges 26 is convexly curved. As a result, the chips produced will be curved and small and thus can be easily transported away from the center of the tool.

Each of the secondary cutting edges 26 intersects two of the main cutting edges. For example, the secondary cutting edge 26 shown at the lower right in FIG. 1 intersects the main cutting edge 25 at point 27', and intersects the main cutting edge 23 at point 27A. As shown in FIG. 6, a line drawn tangent to point 27A coincides with the main cutting edge 23. However, a line drawn tangent to the point 27' forms an obtuse angle β with the main cutting edge 25. Hence, each of the secondary cutting edges is not symmetrical about a plane bisecting the corner. The edges 24 and 25 intersect the secondary edges at points 27" and 27''', respectively.

As can be seen in FIG. 1, the insert 13 is positioned such that the main cutting edge 23 constitutes the "active" main cutting edge (the other main cutting edges 24, 25 being inactive). Also, the secondary cutting edge which constitutes an active secondary cutting edge is the one located adjacent the center axis 11 of the mill. It is preferable that the active secondary cutting edge intersect or at least nearly intersect that center axis when viewed in FIG. 1. During a cutting operation, there occurs a relative rotary movement between the chip and the secondary cutting edge which reduces a tendency for edge build-up to occur. Such edge build-up can occur as the result of the adhesion of undesirable material to the cutting edge (the undesirable material coming from the workpiece), and could lead to premature failure of the cutting edge.

Figure 2:
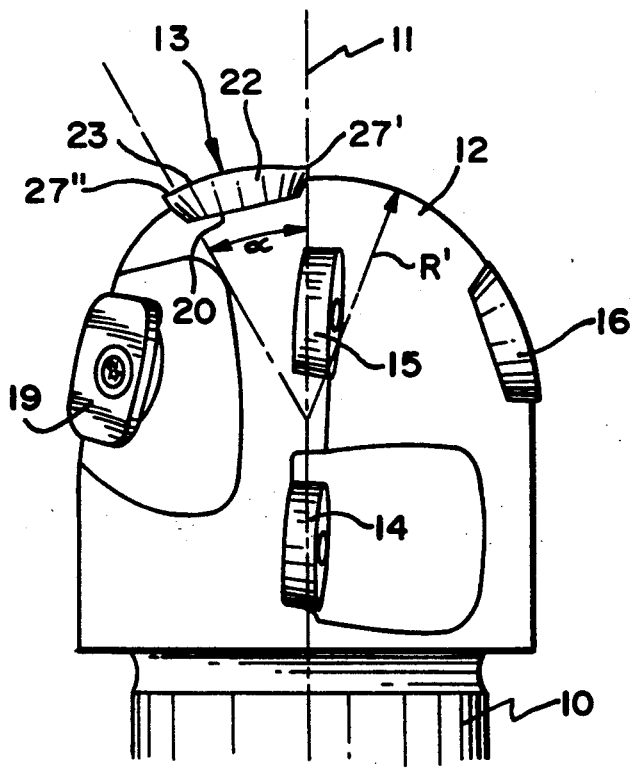
FIG. 2 is a side elevational view of the ball end mill as seen in direction A—A in FIG. 1.
Figure 3:
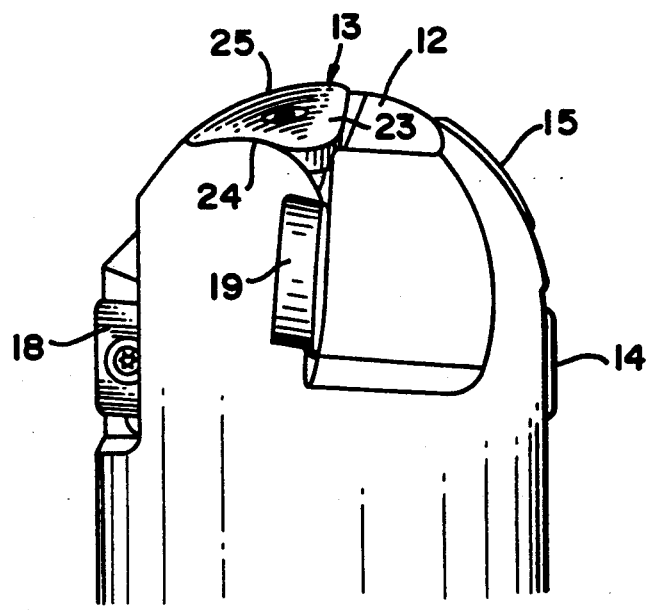
FIG. 3 is a side elevational view as seen in direction C—C in FIG. 1.
Figure 4:
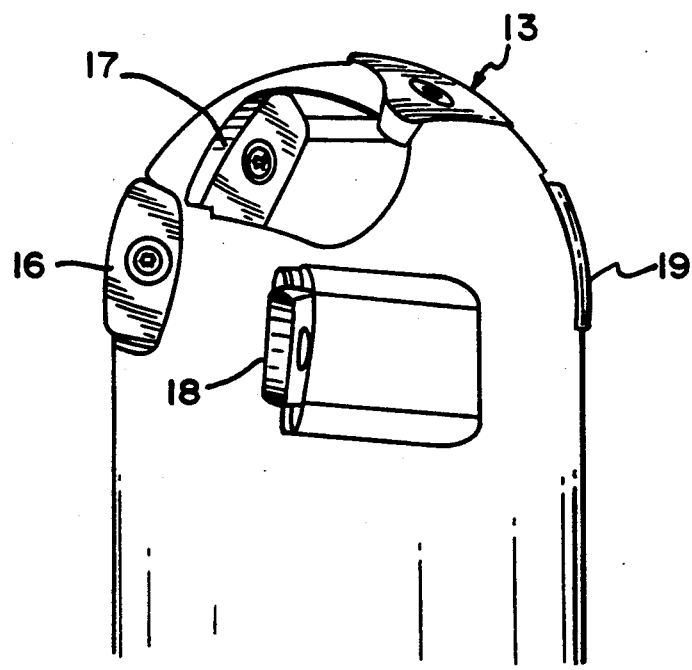
FIG. 4 is a side elevational view as seen in direction B—B in FIG. 1.

The top face 21 of the insert 13 is shaped so that each of the three corner regions 28 is located at a different elevation relative to other portions of the top face 21. For example, when the insert is viewed along a section line VII—VII which bisects both a corner region and the opposite main cutting edge 24, a central portion 36 of the top face which surrounds the aperture 28 is situated at an elevation higher than the corner region 28, as shown in FIG. 7. Moreover, an intermediate portion 30 of the top face situated between the portion 36 and the corner region 28 is at a lower elevation than adjacent beveled portions 31, as is apparent from FIG. 8. Thus, the central portion 36 of the top face is elevated in comparison with each corner portion, whereas the intermediate portion 30 is at a lower level than the bevels 31, 32, 33 located next to cutting edges 25, 24 and 23, respectively. In accordance with one preferred embodiment, the insert 13 is so constructed and arranged that, as shown in FIG. 2, two lines drawn from a center of the radius R' (FIG. 2) to the points 27', 27'', respectively, form an acute angle α of about 30 degrees.

The insert 13 includes a plurality of interjacent surface portions extending from the central portion 36 to the mid-region of a respective main cutting edge. As shown in FIG. 7, each interjacent surface portion includes (i) a beveled face 32 (or 31 or 33) having a width a, (ii) a flat part 34 (having a width b) which is parallel to the bottom face 20, and (iii) an obliquely inclined part 35 (having a width c) which connects the flat part 34 with the central portion 36. The flat part 34 lies at a higher elevation than the central portion 36.

The width a of each of the beveled faces 31, 32, 33 is such as to provide a substantially constant clearance angle. The width b is larger than the width a of the beveled face. The width a should preferably be approximately one-half the width b.

Due to such an arrangement of surface portions 32, 33, it has been found possible to use this end mill as a drilling end mill. For instance, it has been found possible to drill a hole to a depth of one-half of the diameter of the end mill in a normally workable metal workpiece. It is also possible to use this tool for drilling obliquely in relation to the longitudinal axis, i.e., so-called ramping. The invention makes such metal working possible within an angular range from the angle 0 to 90 degrees.

Figure 9:
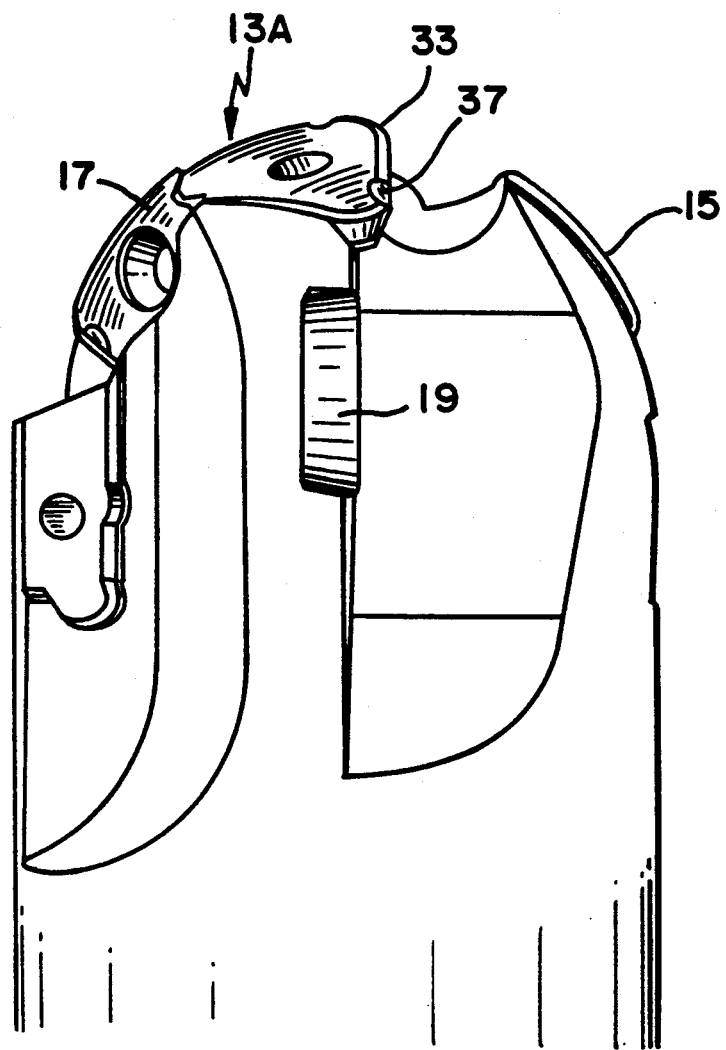
FIG. 9 is a side elevational view of an alternative embodiment of a ball end mill according to the invention.
Figure 10:
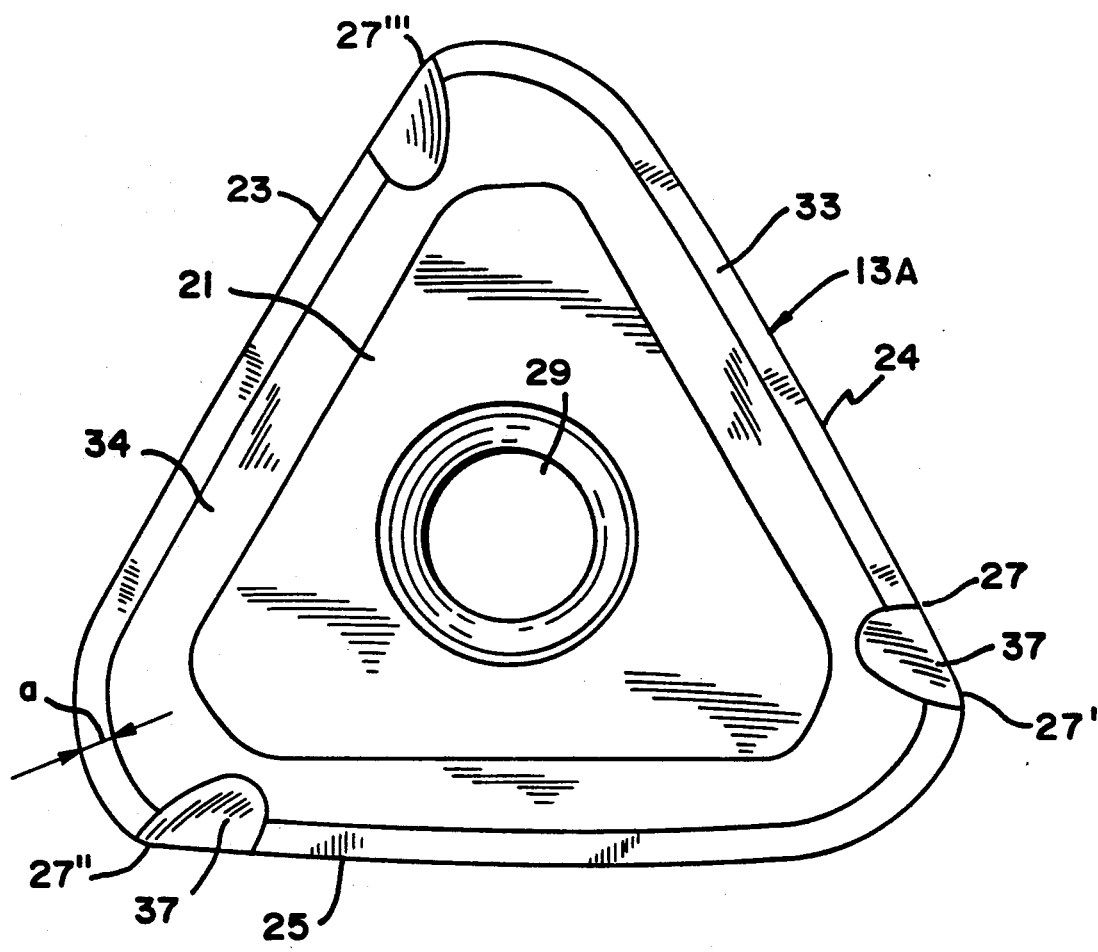
FIG. 10 is a plan view of the alternative embodiment of the central insert of FIG. 9.
Figure 11:
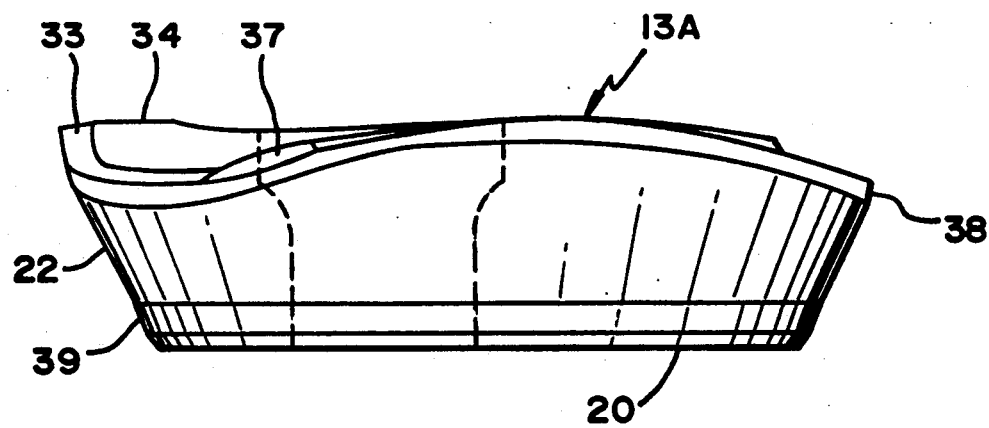
FIG. 11 is a side view of the alternative insert as seen from the right hand side in FIG. 10.

An alternative embodiment of the central insert is shown in FIGS. 9–11 in which the central insert 13A is provided with recesses 37 of concave shape, each of which intersects and extends through the respective main cutting edge for the purpose of obtaining increased clearance of the central portion of the tool during a working operation. This contributes to avoiding small pieces breaking off from the edge which could cause tool failure. This recess 37 starts at about the point 27' (or 27'' or 27''') and extends along a limited portion of the adjacent main cutting edge. At the same time, the recess 37 extends obliquely inwards in relation to the main cutting edge, whereby the extension inwards substantially corresponds to the double the width a of the beveled face 33.

Further, the insert 13A is provided with a strengthening face 38 on its chip surface which extends adjacent to the beveled face 33. Preferably, the strengthening face 38 intersects with the beveled face at an angle of 75 to 85 degrees. The clearance face 22 extends downwards and intersects at an obtuse angle with an edge surface 39 which is obliquely oriented in relation to the bottom face 20.

Although the present invention has been described in connection with preferred embodiments thereof, it will be appreciated by those skilled in the art that additions, modifications, substitutions, and deletions not specifically described may be made without departing from the spirit and scope of the invention as defined in the appended claims.

What is claimed is:

1. A ball nose end mill for metalworking, comprising a rotary body rotatable about a longitudinal axis thereof, a forward end surface of said body being of generally hemispherical shape and including a plurality of cavities; and a plurality of indexable cutting inserts mounted in respective ones of said cavities; a central one of said inserts being of substantially triangular shape and mounted closely adjacent said longitudinal axis; said central insert including a forwardly facing, substantially triangular top face and a plurality of edge faces intersecting one another to form three corner regions, and intersecting said top face to form therewith a plurality of main cutting edges; each of said main cutting edges being disposed between two of said corner regions and being convexly curved when viewed in a direction toward the respective edge face; said central insert being mounted such that one of said main cutting edges constitutes an active cutting edge positioned in a cutting orientation; one corner region of said central insert being situated at an end of said active cutting edge and is located immediately adjacent said axis; said plurality of cutting inserts including additional inserts of generally rectangular shape; each of said additional cutting inserts including a circumferentially facing, generally rectangular top face and a plurality of edge faces intersecting said last-named top face to form therewith a plurality of cutting edges; each of said additional inserts being arranged such that one cutting edge thereof constitutes an active cutting edge positioned in a cutting orientation; said plurality of additional inserts including first and second additional inserts whose cutting edges are convexly curved when viewed in a direction toward their respective top faces; said first and second additional inserts having their active cutting edges disposed on opposite sides of said axis and lying generally in a first plane which contains said axis.

2. A ball nose end mill according to claim 1, wherein said first plane contains said active cutting edge of said front insert.

3. A ball nose end mill according to claim 1, wherein said additional inserts include a third additional insert having a convexly curved active cutting edge arranged substantially in a second plane which contains said axis and which is different from said first plane.

4. A ball nose end mill according to claim 3, wherein said additional inserts include fourth and fifth additional inserts having their active cutting edges arranged substantially in a plane which contains said axis and extends substantially perpendicular to said first plane.

5. A ball nose end mill according to claim 4, wherein said last-named plane corresponds to said second plane.

6. A ball nose end mill according to claim 5, wherein said active cutting edges of said fourth and fifth additional inserts are straight.

7. A ball nose end mill according to claim 5, wherein said additional inserts include a sixth additional insert having a convexly curved cutting edge arranged substantially in a third plane which contains said axis and which is different from said first and second planes.

8. A ball nose end mill according to claim 7, wherein said third and sixth additional inserts are located axially rearwardly relative to said central insert and axially forwardly relative to said first and second additional inserts.

9. A ball nose end mill according to claim 8, wherein said first and second additional inserts are located axially forwardly relative to said fourth and fifth additional inserts; said fourth and fifth additional inserts having straight active cutting edges arranged substantially diametrically opposite one another and extending substantially parallel to said axis.

10. A ball nose end mill according to claim 8, wherein said top faces of said fourth and fifth additional inserts are of square shape.

11. A ball nose end mill according to claim 1, wherein said first and second additional inserts are positioned such that their active cutting edges are oriented substantially parallel to said axis.

12. An indexable cutting insert adapted for use in a ball nose end mill, comprising a substantially flat bottom face on which said insert is to be supported; a generally convexly shaped top face disposed opposite said bottom face; and a plurality of edge faces interconnecting said top and bottom faces, and intersecting said top face at an acute angle, the intersection of said edge faces with said top face forming a plurality of main cutting edges and a plurality of secondary cutting edges, said secondary cutting edges being located at respective corner regions of said insert and being convexly curved when said top face is viewed in plan, each of said main cutting edges being located between respective pairs of said corner regions and being generally convexly curved as viewed in a direction toward its respective edge face, each of said main cutting edges being straight when said top face is viewed in plan; each of said secondary cutting edges intersecting first and second ones of said main cutting edges at first and second points of intersection, respectively, whereby a first line tangent to said first point of intersection coincides with said first main cutting edge as said top face is viewed in plan, and a second line tangent to said second point of intersection forms an angle with said second main cutting edge as said top face is viewed in plan; said top face including a plurality of main beveled portions intersecting said edge faces to form said main cutting edges, and a plurality of secondary beveled portions intersecting said edge faces to form said secondary cutting edges; said generally convex top face including a plurality of intermediate portions each extending downwardly from a central portion of said top face to a respective corner region thereof; each of said intermediate regions being bordered by two of said main beveled portions and extending to a lower elevation than said two main beveled portions.

13. An indexable cutting insert adapted for use in a ball nose end mill, comprising a substantially flat bottom face on which said insert is to be supported; a generally convexly shaped top face disposed opposite said bottom face; and a plurality of edge faces interconnecting said top and bottom faces, and intersecting said top face at an acute angle, the intersection of said edge faces with said top face forming a plurality of main cutting edges and a plurality of secondary cutting edges, said secondary cutting edges being located at respective corner regions of said insert and being convexly curved when said top face is viewed in plan, each of said main cutting edges being located between respective pairs of said corner regions and being generally convexly curved as viewed in a direction toward its respective edge face, each of said main cutting edges being straight when said top face is viewed in plan; each of said secondary cutting edges intersecting first and second ones of said main cutting edges at first and second points of intersection, respectively, whereby a first line tangent to said first point of intersection coincides with said first main cutting edge as said top face is viewed in plan, and a second line tangent to said second point of intersection forms an angle with said second main cutting edge as said top face is viewed in plan; said top face includes a plurality of interjacent surface portions extending from a central flat portion of said top surface toward the mid-region of respective ones of said main cutting edges; said interjacent surface portions including a flat part disposed at an elevation which is higher than said central portion; said central portion being disposed at an elevation higher than said corner regions.

14. An indexable cutting insert adapted for use in a ball nose end mill, comprising a substantially flat bottom face on which said insert is to be supported; a generally convexly shaped top face disposed opposite said bottom face; and a plurality of edge faces interconnecting said top and bottom faces, and intersecting said top face at an acute angle, the intersection of said edge faces with said top face forming a plurality of main cutting edges and a plurality of secondary cutting edges, said secondary cutting edges being located at respective corner regions of said insert and being convexly curved when said top face is viewed in plan, each of said main cutting edges being located between respective pairs of said corner regions and being generally convexly curved as viewed in a direction toward its respective edge face, each of said main cutting edges being straight when said top face is viewed in plan; each of said secondary cutting edges intersecting first and second ones of said main cutting edges at first and second points of intersection, respectively, whereby a first line tangent to said first point of intersection coincides with said first main cutting edge as said top face is viewed in plan, and a second line tangent to said second point of intersection forms an angle with said second main cutting edge as said top face is viewed in plan; said top face including a plurality of main beveled portions intersecting said edge faces to form said main cutting edges, and a plurality of flat surface portions disposed inwardly of the mid-regions of respective ones of said main beveled portions; said flat surface portions being oriented parallel to said bottom face.

15. An indexable cutting insert adapted for use in a ball nose end mill, comprising a substantially flat bottom face on which said insert is to be supported; a generally convexly shaped top face disposed opposite said bottom face; and a plurality of edge faces interconnecting said top and bottom faces, and intersecting said top face at an acute angle, the intersection of said edge faces with said top face forming a plurality of main cutting edges and a plurality of secondary cutting edges, said secondary cutting edges being located at respective corner regions of said insert and being convexly curved when said top face is viewed in plan, each of said main cutting edges being located between respective pairs of said corner regions and being generally convexly curved as viewed in a direction toward its respective edge face, each of said main cutting edges being straight when said top face is viewed in plan; each of said secondary cutting edges intersecting first and second ones of said main cutting edges at first and second points of intersection, respectively, whereby a first line tangent to said first point of intersection coincides with said first main cutting edge as said top face is viewed in plan, and a second line tangent to said second point of intersection forms an angle with said second main cutting edge as said top face is viewed in plan; said top face including a central portion; a central aperture extending through said insert from said top face to said bottom face; said top face including a flat surface situated between said central portion and a mid-region of each of said main cutting edges; an inclined face interconnecting said central portion with each of said flat surfaces.

* * * * *